United States Patent
Nabkel et al.

(10) Patent No.: US 7,139,376 B2
(45) Date of Patent: Nov. 21, 2006

(54) METHOD AND SYSTEM FOR PROVIDING PRESELECTED INFORMATION SERVICES UPON DETECTION OF AN OFF-HOOK CONDITION

(75) Inventors: Jafar Nabkel, Boulder, CO (US); Karen Siegel-Jacobs, Boulder, CO (US); Harvey J. Benson, Highlands Ranch, CO (US); Edward A. Youngs, Boulder, CO (US); Donald E. Gillespie, Boulder, CO (US); Mark S. Maize, Westminster, CO (US); Mark W. Hardison, Aurora, CO (US)

(73) Assignee: Qwest Communications International Inc., Denver, CO (US)

( * ) Notice: Subject to any disclaimer, the term of this patent is extended or adjusted under 35 U.S.C. 154(b) by 124 days.

(21) Appl. No.: 09/785,863

(22) Filed: Feb. 16, 2001
(Under 37 CFR 1.47)

(65) Prior Publication Data

US 2002/0114437 A1    Aug. 22, 2002

(51) Int. Cl.
*H04M 3/42* (2006.01)
*H04M 1/64* (2006.01)
(52) U.S. Cl. .............. 379/201.01; 379/88.22
(58) Field of Classification Search ........ 379/88.2, 379/88.5, 88.7, 201.01–201.12, 88.22–88.25
See application file for complete search history.

(56) References Cited

U.S. PATENT DOCUMENTS

| | | | |
|---|---|---|---|
| 4,289,930 A | 9/1981 | Connolly et al. ............ 179/2 |
| 4,811,382 A | 3/1989 | Sleevi ............ 379/67 |
| 5,222,120 A * | 6/1993 | McLeod et al. ............ 379/196 |
| 5,309,506 A | 5/1994 | Alexander ............ 379/95 |
| 5,390,237 A | 2/1995 | Hoffman, Jr. et al. ........ 379/67 |
| 5,524,139 A | 6/1996 | Jones ............ 379/67 |
| 5,615,257 A | 3/1997 | Pezzullo et al. ............ 379/396 |
| 5,652,784 A | 7/1997 | Bleu et al. |
| 5,946,378 A | 8/1999 | Farfan ............ 379/88.23 |
| 6,009,150 A * | 12/1999 | Kamel ............ 379/88.22 |
| 6,311,063 B1 * | 10/2001 | Valliani et al. ............ 455/433 |
| 6,373,817 B1 * | 4/2002 | Kung et al. ............ 370/215 |

FOREIGN PATENT DOCUMENTS

WO    WO 00/62518 A1    10/2000

* cited by examiner

*Primary Examiner*—Benny Q. Tieu
(74) *Attorney, Agent, or Firm*—Townsend and Townsend and Crew LLP

(57) ABSTRACT

A method and system for providing preselected information services to a subscriber includes detection of an off-hook condition at a subscriber telephone line and determining the preselected information services for the subscriber. A message is generated corresponding to the determined information services by correlating the subscriber's directory number to the selected information services in the subscriber's profile.

3 Claims, 2 Drawing Sheets

METHOD AND SYSTEM FOR PROVIDING PRESELECTED INFORMATION SERVICES UPON DETECTION OF AN OFF-HOOK CONDITION

TECHNICAL FIELD

The present invention relates generally to information services, and more particularly, to a method and system for providing preselected information services to a telephone subscriber.

BACKGROUND ART

Dial tone is an "in-band" tone signal generated by a switching facility such as a central office switch or other telephone network component upon detection of an "off-hook" condition at a subscriber premise. Typically, dial tone, as deployed in the United States, is a combination of a 350 Hz tone and a 440 Hz tone. Dial tone has historically served the role of informing a telephone service subscriber that his or her telephone network is in proper working order and is available for use to place a call. The provision of dial tone is so common and familiar to telephone users that many wireless communications systems now also provide dial tone to users upon depression of an associated key such as, for example, a "talk" button.

While the above-mentioned dial tone serves the purpose of informing a caller that his or her communications network is in proper working order and available for use, it serves no other useful purpose for the caller.

Consequently, a need has developed for an improved method of informing a telephone service subscriber and, in particular, a calling party that his or her communications network is available for use to place a phone call and to provide quick access to user selectable preferred information, or conversely, to information automatically "pushed" to the subscriber with the subscriber's prior approval as a means to a reduced or even free local telephone service rate structure. Such a method and system should provide this function to the subscriber in a manner which enhances the subscriber's communication experience.

DISCLOSURE OF INVENTION

It is the principal object of the present invention to provide an improved method and system for informing a telephone service subscriber that his or her communications network is in working order and available for use to place a telephone call.

It is the further object of the present invention to provide such a method and system which provides additional information to the telephone service subscriber as part of the information signal.

In carrying out the above object and other objects, features, and advantages of the present invention, there is provided a method for providing information services to a subscriber. The method is adapted for use in a communication network comprising a plurality of subscriber telephone lines, each coupled to an associated telephone switching facility. Each subscriber telephone line includes at least one Directory Number (DN) and an associated subscriber Profile including selected information services.

The method comprises detecting an "off-hook" condition at a subscriber telephone line and determining the information selected by the subscriber by correlating the subscriber's directory number with the selected information services in the subscriber's profile. Thereafter, an audio message is generated corresponding to the selected information services for receipt by the subscriber. In keeping with the invention, the correlation step may be based on any suitable predetermined criteria such as, for example, time, date, day of week, last detected off-hook condition, etc. The communication network may be any suitable wired or wireless communication network including the Public Switched Telephone Network (PSTN), an Advanced Intelligent Network (AIN), a broadband network, a cable network, a fiber-optic network, the Internet, or any hybrid or combination thereof. The information services provided as part of the subscriber profile may also include any suitable predetermined information such as, for example, news, stock quotes, horoscope, message notification from one or more message servers (e.g. e-mail or voice mail), tally of number of waiting e-mail or voice mail messages, traffic reports, weather reports, sports scores, etc.

In exchange for service discounts, subscribers might also receive advertisements from local, regional, national, or even international businesses. Such information may be as short as 2–3 seconds for any one topic or may minutes for multiple topics.

The information services may be provided to the subscriber in place of dial tone or may be provided in advance of or subsequent to dial tone. That is, by entering a predetermined code, speaking a set of commands or employing an alternate signaling method, a user may end the information service announcement and receive dial tone or end the dial tone and receive the information service announcement. Regardless of when the information service is provided in relation to dial tone, it is anticipated that the announcement may be terminated simply by selecting the appropriate calling number such as, for example, by generating DTMF (dual tone multi-frequency) prompts by depressing the appropriate keys on a telephone or computer, or by speaking the proper addresing information. Going "on hook", that is, hanging up the telephone will also terminate the announcement.

It is also the intention of this invention that it would be possible for a user to selectively respond to the information that has been provided in lieu of traditional "dial tone". By activating appropriate dial commands or voice commands for example, the user would have the ability to retrieve e-mail or voice mail messages, respond to such messages, or transfer such messages to another location or medium.

In carrying out the above method, there is provided a system for providing information services to a telephone subscriber. The system is adapted for use in the communication network comprised of a plurality of subscriber telephone lines, each coupled to an associated telephone switching facility. Each subscriber telephone line has at least one Directory Number and an associated subscriber Profile including selected information services. Again, the communication network may be any suitable wired or wireless communication network including the PSTN, an AIN, a cellular or PCS network, a broadband network, a cable network, a fiber-optic network, the Internet, or any other suitable combination or hybrid thereof. The system includes means for detecting an off-hook condition on a subscriber telephone line and means for determining information services selected by the subscriber. Still further, the system includes means for generating an audio message corresponding to the selected information services for receipt by the subscriber.

These and other objects, features, and advantages or the present invention will become more readily apparent by

BEST MODE FOR CARRYING OUT THE INVENTION

Figure 1:
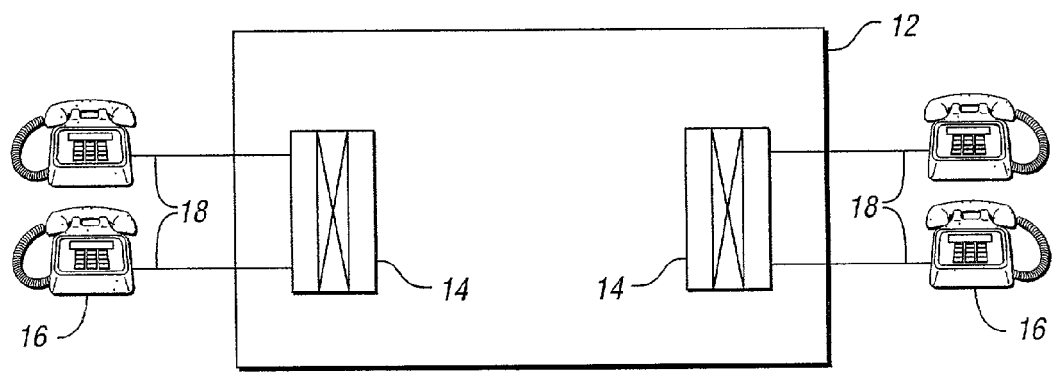
FIG. 1 is a generalized schematic diagram of a communication system for carrying out the present invention.
Figure 2:
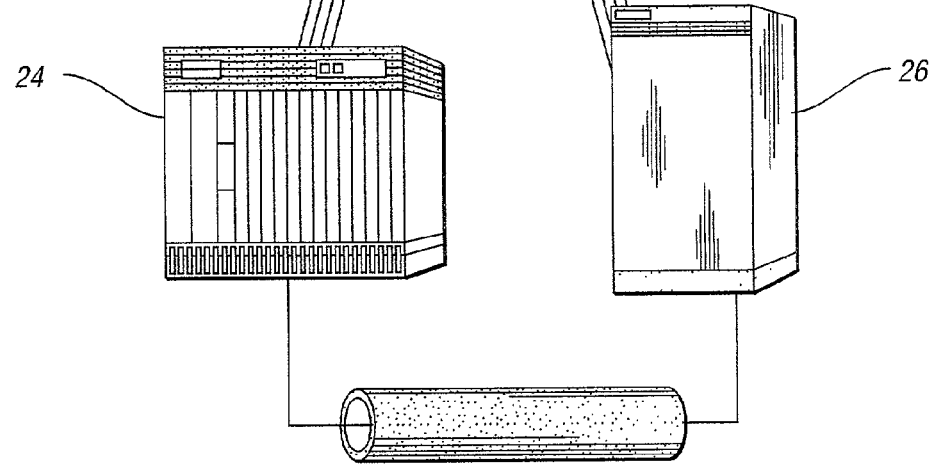
FIG. 2 is a detailed schematic diagram of a communication system for carrying out the present invention.

With reference to FIG. 1 of the drawings, there is shown a communication system designated generally by reference numeral 10 for providing information services to a telephone subscriber. As shown, the system comprises a telephone network 12 which may be any suitable communications network including, but not limited to, the Public Switched Telephone Network (PSTN), an Advanced Intelligent Network (AIN), a wireless network such as a cellular or PCS network, or any other suitable wired or wireless network or combination thereof including a broadband network, a cable network, a fiber-optic network, the Internet, etc.

Network 12 includes at least one switching facility 14 such as a Central Office Switch (COS) which is provided in communication with a plurality of telephone subscribers via Customer Premises Equipment (CPE) devices such as telephones 16 and Local Transport Facilities 18. Of course, any suitable CPE device may be used including, without limitation, a facsimile machine, a wireless telephone, a personal digital assistant, a computer, or any other electronic device having voice transmission and reception capabilities.

As indicated above, dial tone has historically served the role of informing a caller that the subscriber's communications network is in proper working order and is available for use to place a telephone call. Presently, to obtain information services, a telephone subscriber must either place a call via the Public Switched Telephone Network (PSTN) to an information service provider and generate Dual Tone Multi-Frequency (DTMF) tones, voice commands, or other signaling methodology to retrieve the desired information, or the subscriber must use another source (print or electronic) and another device (e.g. a television, a computer, a web browser, a digital assistant, etc.) to retrieve the information. Both existing methods are cumbersome, time-consuming, and often times, inconvenient.

In addition, as those skilled in the art will recognize, current voice messaging methods of notification include audible stutter dial tone, visual message waiting indication, out call notification to a telephone, and notification to a paging device. Enabling any of the above indicators to telephony users not familiar with what they mean or how to access the messages that may have been left has heretofore caused message recipient great difficulty.

The present invention replaces or enhances prior art dial tone by providing an informative announcement which delivers desired information directly to the telephone subscriber. That is, rather than requiring the subscriber to pro-actively retrieve desired information by calling a service provider or generating DTMF signaling, the subscriber may simply pick-up his or her telephony device and be provided information services in accordance with an associated profile. As readily seen, not only does the present invention save the subscriber time, it serves the dual purpose of providing information as well as informing the subscriber that the telephony device and associated network is in proper working order and available to place a telephone call.

The present invention, supports packet-based networks such as, for example, the Internet for telephony communications. In such cases, when a subscriber initiates a request for a communication connection by sending a message to a shared network from a packed-enabled telephony (hardware and/or software), the network system will deliver the information directly to the subscriber. Information provided to the subscriber may be information "pushed" to the subscriber or information selected by the subscriber.

A subscriber such as a user of CPE device 16, will select information services to which the subscriber would like to receive. It is also anticipated that the subscriber may select what information he or she desires to receive in accordance with predetermined criteria. For example, if a subscriber is interested in receiving information regarding the weather, or any other information which typically does not change rapidly, the subscriber may provide in her Profile to be updated on this information every nth call or every n hours. As readily seen, any suitable criteria may be used including, without limitation, day, date, time, time since last detected off-hook condition, etc. This information will be included in the subscriber's Profile and correlated with the subscriber upon detection of an off-hook condition at the subscriber's CPE device.

More specifically, following detection of an "off-hook" condition at the subscriber's telephony device, a switching facility or other network component such as, for example, an Intelligent Peripheral (IP) (not shown), database, etc., will perform an appropriate look-up correlating the subscriber's Directory Number (DN) with all stored subscriber profiles in order to determine not only the subscriber's information services Profile but the information services to be provided to the subscriber at that specific time and/or location based on the criteria indicated above. Of course, if the subscriber places a call from an unknown (non-registered) CPE device or a CPE device other than his own (such as a friend's telephone), one may identify oneself by, for example, entering appropriate digits or voice commands and be provided information services in accordance with one's personal Profile. Such identification and pass codes may also be required to distinguish between multiple subscriber's sharing one or more CPE devices or telephone lines. In such case, default services may be preselected such as weather, time, etc., with specific services provided (sports scores, stock quotes, e-mail and/or voice mail messages, number of waiting e-mail and/or voice mail messages, etc.) upon entry of an identifying pass code.

Accordingly, the present invention allows a telephone subscriber to preconfigure (through any variety of interfaces, including, but not limited to, a telephone using DTMF tones, a text or keyboard device, a graphical-pen device, a web browser, an Internet telephone, a television-like device, etc.) what specific information or topics the subscriber desires to receive in place of standard dial tone. Again, this information may include, but is not limited to, the current sports score of a particular team, a current quote on a specific stock or stocks, the current weather condition or forecast, a specific horoscope, number of messages, new or old, waiting to be retrieved at a message server for the subscriber, actual e-mail and/or voice mail messages from the message server, current traffic conditions for a particular road or route, etc.

In exchange for service discounts, subscribers might also receive advertisements from local, regional, national, or even international businesses. Such information may be as short as 2–3 seconds for any one topic or many minutes for multiple topics. Of course, at any time during the information announcements, a subscriber may dial or otherwise send digits by pressing touch tone keys, selecting a speed-dial preprogrammed button, or activating any suitable automated dialing assistant (desired out-going call) which would terminate the information announcement.

Additionally, a subscriber may choose in advance the option of requesting additional topics or more detailed information in real time by entering a designated code such as, for example, a "star code" sequence or other suitable input. The system of the invention herein would also provide a special "code" to allow the subscriber to indicate to the network system the subscriber has finished with requesting additional topics and available or ready to place a call.

Figure 3:
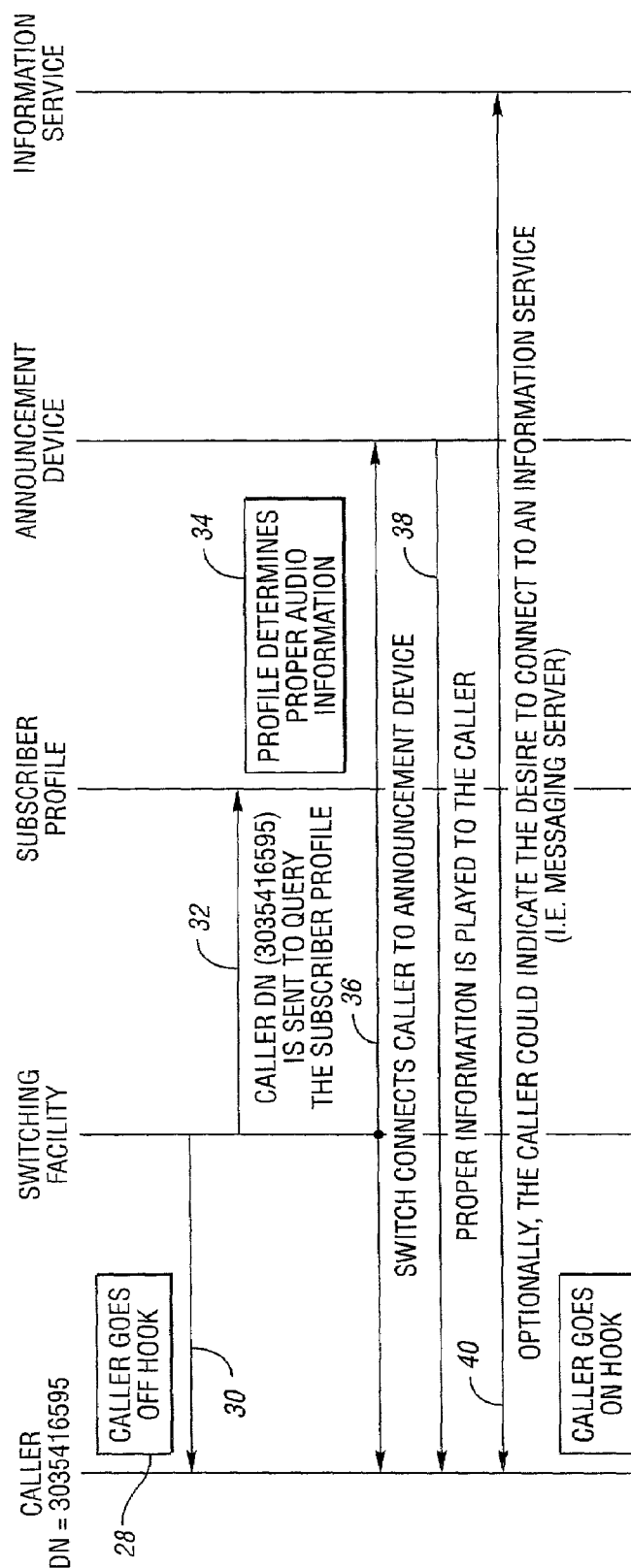
FIG. 3 is a flow diagram of the present invention.

FIG. 3 of the drawings illustrates a suitable architecture for carrying out the present invention. As shown, the system includes a Central Office Switch (COS) 20 in communication with a subscriber via a CPE device such as a telephone 22. COS 20 is further provided in communication with an External Application Server 24 and a Messaging Server 26 via appropriate trunk groups 28. External Application Server 24 and Messaging Server 26 are further provided in communication with one another via a suitable wired or wireless link such as a TCP/IP connection. In keeping with the invention, Messaging Server 26 may be any suitable server such as, for example, a voice messaging server, an e-mail server, etc.

With reference now to FIG. 3 of the drawings, there is provided a flow diagram illustrating the method of the present invention. As indicated above, the method is specifically adapted for use in a communication network comprising a plurality of subscriber telephone lines each of which is coupled to an associated telephone switching facility. Each subscriber telephone line includes at least one Directory Number and an associate subscriber profile including selected information services and, more preferably, specific criteria for providing such information services to the subscriber. The subscriber activates the system by "going off-hook" 28 on the subscriber's communication device. This indicates to the network system (and possibly the device itself) to deliver the information announcements to the subscriber. In a preferred embodiment for a traditional Public Switch Telephone Network, the system does this by detecting 30 an "off-hook" condition on the subscriber's terminating line (possibly an Advanced Intelligent Network (AIN) trigger) and then launching a query 32 to determine the subscriber's profile. Typically the query includes the subscriber's directory number for correlation purposes. Once the subscriber's profile has been determined, corresponding information (audio and/or video, text, graphic, etc.) will be collected or located 34. Thereafter, the switching facility connects 36 the subscriber to a suitable announcement or presentation device capable of proving the information. Finally, the information is provided or played 38 to the subscriber.

Alternatively, if the subscriber has not preselected information, but has agreed to the receipt of "pushed" information including, for example, advertising, the "pushed" information would be delivered to the subscriber in the same manner. Still further, the subscriber could manually select or indicate to her desire to connect to an information service.

The above activation step might include connecting an adjunct voice-information processor to the subscriber's terminating line while still listening for DTMF tones which indicate the subscriber is "placing a call". Alternatively, in a switch-based system, the system might send a digital request to a designated server which already has updated announcements stored digitally for all possible subscriber requests. The server would, in turn, deliver the digital information packets to the subscriber's serving switch system which, in turn, would concatenate multiple announcements and convert them into an analog announcement which the subscriber hears.

Alternatively, a packet-based telephony device in communication with a packet-based network might deliver the digitized information packets directly to a subscriber's device for either textural, graphic, graphical, or video display, or for conversion to auditory replay. Those skilled in the art will therefore recognize that multiple combinations of these methods exist for detection of "off-hook" and delivery of messages. Of course, the foregoing processing is intended to occur transparently and preferably instantaneously.

Regardless of how much the information announcement is accessed and generated by the system, the subscriber will be allowed to receive as much or as little of the announcement as desired. When a subscriber begins to place a call the system (either the shared network system or the intelligent communications device) will detect the requested digits and immediately terminate the information announcements.

Figure 4:
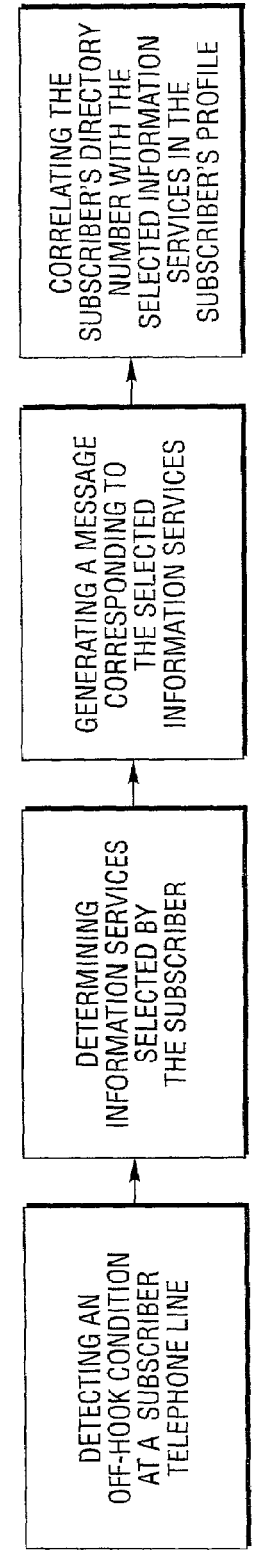
FIG. 4 is a block diagram of the method steps of the present invention.

The generalized method steps of the present invention are illustrated in FIG. 4. As shown, the method comprises detecting 42 and off-hook condition at a subscriber telephone line. Thereafter, the information services (audio, video, text etc.) are determined 44. Once the information services are determined, a corresponding message is generated 46. In keeping with the invention, the step of determining typically, but not necessarily includes correlating 48 the subscriber directory number with the selected information services in the subscriber's profile. Such correlation may be direct or in accordance with predetermined criteria such as, for example, time, date, day of week, etc.

The present invention has a particular utility for providing message notification to message service users specifically voice message users. As those skilled in the art will recognize, current voice messaging methods of notification include audible stutter dial tone, visual message waiting indication, out call notification to a telephone, and notification to a paging device. Enabling any of the above indicators to telephony users not familiar with what they mean or how to access the messages that may have been left has heretofore caused message recipient great difficulty.

The delivery of a voice or other suitable data message notification in lieu of traditional dial tone, and in addition to the option of selectively choosing to receive a voice message is a prominent example of an excellent application of this invention, recognizing that numerous other information sources could be used in lieu of traditional dial tone and in lieu of the voice messaging application. The following details how voice messaging notification embodiment of the invention would function:

Utilizing non-AIN implicit routing, available on switches such as those provided by Nortel and Lucent digital switches, customer line translations may be provisioned with an implicit access feature. This feature known as Network Facility Access (NFA) on the Nortel switch and ASI proxy on the Lucent switch will create a digital bridge to the customer's line and a digital trunk group connected to an application server outside of the switching network. In operation, an External Application Server (EAS) will communicate with the serving switch via four wire E and M trunks utilizing wink signaling for supervision and call set-up, and in-band DTMF signaling to provide Calling Number Identification (CNI). This will allow the application server to control the serving switches digital bridge and isolate the customer from network DTMF receivers while connected directly to the EAS and signaling tones during call progression. This access scheme also provides a separate transmit and receive path between a serving switch and the EAS for more accurate speech recognition.

As shown in FIG. 3, the EAS is also connected via TCP/IP connections to messaging platforms APIs in order to obtain information of the status of messages in a customer's mailbox. Information includes the number of new voice, fax, and e-mail messages depending on the capabilities of the messaging platform. In keeping with the invention, the basic call flow for a customer is as follows for the following conditions:

New voice messages are in the customer's message queue;

Customer wants to review message in queue;

Speech recognition is not active;

Customer is served by a Nortel DMS 100 class five end office.

Customer Goes Off-Hook:

Implicit translation in line translation indicates routing for connection to EAS via NFA trunk group;

Digital bridge between the customer and the EAS is created and the server is notified via a wink that a call is present on the selected NFA trunk;

The serving switch isolates the talk path to the customer and sends CNI information to the EAS for the customer connected to the NFA trunk;

A query is sent from the EAS via the TCP/IP link to the customer's serving messaging platform API, for status of messages;

Response from the query indicate that the customer has two new voice messages;

The EAS sends a wink to the serving switch to connect the customer to the NFA trunk;

The serving switch establishes the connection via the digital bridge and isolates the customer from the switches DTMF receivers as well as any dial tone source (this process must be done in less than 50 msec);

Customer is Connected to EAS:

The external server prompts the customer with "You have two new voice messages. To review your messages press *(n) or you may dial normally at any time.";

Customer presses *(n) indicating to the EAS to connect the customer to their appropriate messaging platform.

EAS Connects to Messaging Platform:

The EAS queries internal tables or databases containing information on the customer's serving messaging platform and the dialing information to access the platform;

EAS signals the serving switch via wink signaling to isolate customer from both the EAS and the switches DTMF receivers;

This also connects the EAS NFA trunk to a DTMF receiver;

EAS dials the customer's serving messaging platform monitoring call progression and verifying proper connection to the customer's correct messaging platform and mailbox.

Customer Connected to the Serving Messaging Platform:

EAS signals the serving switch with a wink to establish a stable connection between the customer's line and the serving messaging platform;

This releases the digital bridge as well as the NFA trunk to the EAS;

Customer is prompted on how to retrieve messages.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of providing information services to a subscriber, comprising:

at a network component of a communications network, receiving a selection of information services from a subscriber, wherein the selection includes a Directory Number (DN) associated with the subscriber and a number of calls selected by the subscriber and indicating a frequency with which the subscriber selects to receive the information services and wherein the communication network includes a plurality of subscriber lines, each having a DN associated therewith;

storing the selection of information services, the DN, and the frequency as a subscriber profile relating to the subscriber;

detecting, via the communications network, an off-hook condition at one of the plurality of subscriber lines, wherein the subscriber line relates to the subscriber;

in response to detecting the off-hook condition, determining the DN relating to the subscriber line;

correlating the DN to a plurality of stored subscriber profiles to determine the subscriber profile relating to the DN;

consulting the subscriber profile relating to the subscriber to determine the information services selected by the subscriber;

based on the frequency and the selection of information services in the subscriber profile, determining information services to provide to the subscriber; and providing the information services to the subscriber via the communications network in place of a dial tone.

2. The method of claim 1, further comprising:

via the same subscriber line, receiving a pass code relating to a different subscriber;

using the pass code to locate a different stored subscriber profile relating to the different subscriber;

using the different subscriber profile to determine information services to provide to the different subscriber; and providing the information services to the different subscriber via the communications network.

3. A method of providing information services to a subscriber, comprising:

at a network component of a communications network, receiving a selection of information services from a subscriber, wherein the selection includes a Directory Number (DN) associated with the subscriber and a number of calls selected by the subscriber and indicating a frequency with which the subscriber selects to receive the information services and wherein the communication network includes a plurality of subscriber lines, each having a DN associated therewith;

storing the selection of information services, the DN, and the frequency as a subscriber profile relating to the subscriber;

detecting, via the communications network, an off-hook condition at one of the plurality of subscriber lines, wherein the subscriber line relates to the subscriber;

in response to detecting the off-hook condition, determining the DN relating to the subscriber line;

correlating the DN to a plurality of stored subscriber profiles to determine the subscriber profile relating to the DN;

consulting the subscriber profile relating to the subscriber to determine the information services selected by the subscriber;

based on the frequency and the selection of information services in the subscriber profile, determining information services to provide to the subscriber;

providing the information services to the subscriber via the communications network in place of a dial tone;

detecting at the network component of the communications network a signal from the subscriber;

ending the information services to the subscriber; and providing the dial tone to the subscriber via the communications network in place of the information services.

* * * * *